United States Patent [19]

Lagas et al.

[11] Patent Number: 4,988,494
[45] Date of Patent: Jan. 29, 1991

[54] PROCESS FOR RECOVERING SULFUR FROM SULFUR-CONTAINING GASES

[75] Inventors: Jan A. Lagas, Monnickendam; Johannes Borsboom, Rijswijk; Pieter H. Berben, Zeist; John W. Geus, Bilthoven, all of Netherlands

[73] Assignees: VEG-Gasinstituut N.V.; Comprino, B.V., both of Netherlands

[21] Appl. No.: 37,954

[22] Filed: Apr. 13, 1987

[30] Foreign Application Priority Data

Apr. 16, 1986 [NL] Netherlands .................... 8600960

[51] Int. Cl.$^5$ ............................................ C01B 17/04
[52] U.S. Cl. ................................ 423/574 R; 423/576.8
[58] Field of Search .............. 423/574 R, 576, 573 G, 423/576.8

[56] References Cited

U.S. PATENT DOCUMENTS

| | | | |
|---|---|---|---|
| 3,987,154 | 10/1976 | Lagas | 423/574 R |
| 4,123,507 | 10/1978 | Hass | 423/573 G |
| 4,243,647 | 1/1981 | Hass et al. | 423/573 G |
| 4,279,882 | 7/1981 | Beavon | 423/574 R |
| 4,311,683 | 1/1982 | Hass et al. | 423/573 G |
| 4,519,992 | 5/1985 | Alkhazov et al. | 423/576.8 |
| 4,605,546 | 8/1986 | Voirin | 423/574 R |
| 4,620,967 | 11/1986 | Tippmer | 423/574 R |
| 4,818,740 | 4/1989 | Berben et al. | 423/576 |

FOREIGN PATENT DOCUMENTS

| | | |
|---|---|---|
| 0078690 | 5/1983 | European Pat. Off. . |
| 0085213 | 8/1983 | European Pat. Off. . |
| 0071983 | 2/1983 | Fed. Rep. of Germany . |
| 6901632 | 8/1969 | Netherlands . |
| 176160 | 4/1975 | Netherlands . |
| 7603622 | 10/1977 | Netherlands . |

OTHER PUBLICATIONS

B. G. Goar, J. A. Sames, Western Research Division of Bow Valley Resource Services, Ltd., Calgary, Alberta, Canada, 33rd Annual Gas Conditioning Conference, Norman, Oklahoma, Mar. 7-9, 1983.

L. C. Hardison, Chemical Engineering, pp. 62-63, Jan. 1985.

L. C. Hardison, Hydrocarbon Processing, pp.70-71, Apr. 1985.

R. H. Hass et al., Hydrocarbon Processing, pp. 104-107, May 1981.

KTI Manufacturer's publication on Lo-Cat Liquid Catalytic Oxidation Systems.

A. J. Moyes and J. S. Wilkinson, The Chemical Engineer, pp. 84-90, Feb. 1974.

Harold G. Paskall, Capability of the Modified-Claus Process, report to the Department of Energy and Natural Resources, Province of Alberta, published by Western Research and Development, Division of Bow Valley Resource Services, Ltd., Mar. 1979.

Primary Examiner—Jeffrey E. Russel
Attorney, Agent, or Firm—Weingarten, Schurgin, Gagnebin & Hayes

[57] ABSTRACT

The invention is directed to a process for the recovery of sulfur from a hydrogen sulfide containing gas, which comprises oxidizing hydrogen sulfide with oxygen, and then reacting the product gas of this oxidation further by using at least two catalytic stages, in accordance with the equation: $2H_2S + SO_2 \rightleftharpoons 2H_2O + 3/n\ S_n$. In order to improve the process and the process control, the invention is characterized in that the $H_2S$ concentration in the gas leaving the last catalytic stage is controlled to have a value ranging between 0.8 and 3% by volume by reducing the quantity of combustion or oxidation air passed to the oxidation stage and/or causing a portion of the hydrogen sulfide containing feedstock gas to bypass the oxidation stage and to be added to the gas flowing to a catalytic stage.

14 Claims, 3 Drawing Sheets

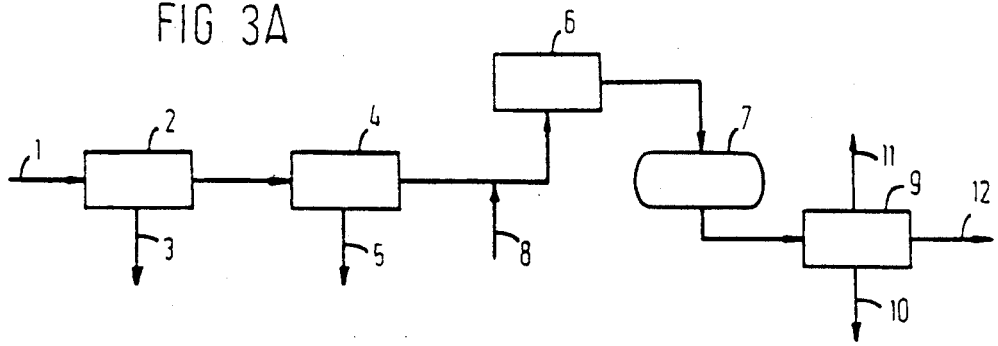
FIG. 3A
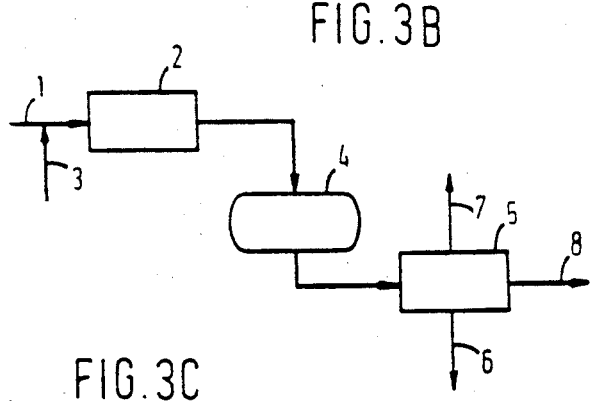
FIG. 3B
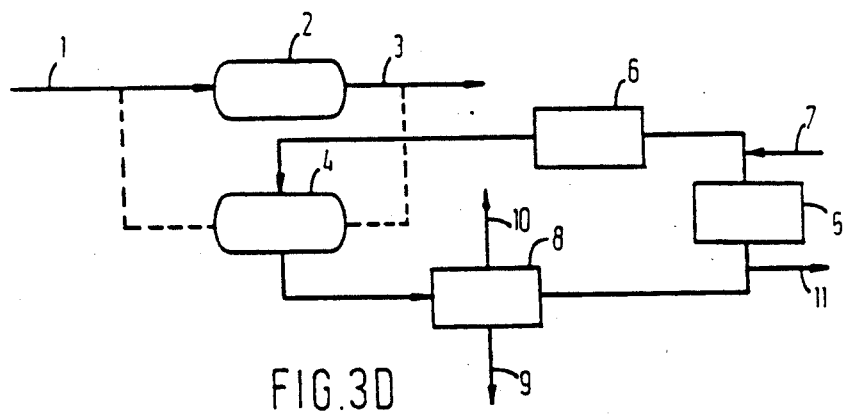
FIG. 3C
FIG. 3D
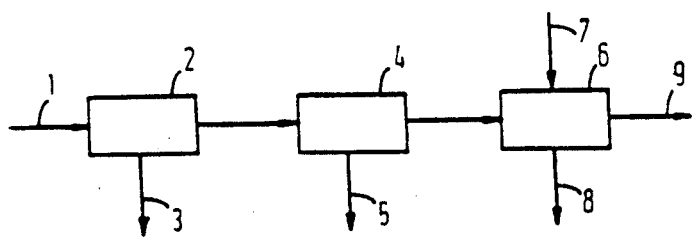

PROCESS FOR RECOVERING SULFUR FROM SULFUR-CONTAINING GASES

BACKGROUND OF THE INVENTION

In a number of processes, such as the refining of crude oil, the purification of natural gas and the production of synthesis gas from, for example, fossil fuels, sulfur containing gas, in particular H$_2$S containing gas, is released. On account of its high toxicity and its smell, the emission of H$_2$S is not permissible.

The best known and most suitable process for recovering sulfur from hydrogen sulfide is the so-called Claus process. In this process hydrogen sulfide is converted by oxidation to a considerable extent into elemental sulfur; the sulfur thus obtained is separated by condensation. The residual gas stream (the so-called Claus residual gas) still contains some H$_2$S and SO$_2$.

The method of recovering sulfur from sulfur containing gases by the so-called Claus process is based on the following reactions:

$$2H_2S + 3O_2 \rightarrow 2H_2O + 2SO_2 \quad (1)$$

$$4H_2S + 2SO_2 \rightarrow 4H_2O + 6/nS_n \quad (2)$$

Reactions (1) and (2) result in the main reaction:

$$2H_2S + O_2 \rightarrow 2H_2O + 2/nS_n \quad (3)$$

A conventional Claus unit—suitable for processing gases having an H$_2$S content of between 50 and 100%—comprises a burner with a combustion chamber, the so-called thermal stage, followed by a plurality of reactors—generally two or three—filled with a catalyst. These last stages constitute the so-called catalytic stages.

In the combustion chamber, the incoming gas stream, which is rich in H$_2$S, is combusted with an amount of air at a temperature of ca. 1,200° C. This stoichiometric amount of air is adjusted so that one third of the H$_2$S is fully combusted to form SO$_2$ in accordance with the following reaction $$2H_2S + 3O_2 \rightarrow 2H_2O + 2SO_2 \quad (1)$$

After this partial oxidation of H$_2$S the non-oxidized part of the H$_2$S (i.e. basically two-thirds of the amount offered) and the SO$_2$ formed react further as to a considerable portion, in accordance with the Claus reaction:

$$4H_2S + 2SO_2 \rightarrow 4H_2O + 3S_2 \quad (2)$$

Thus, in the thermal stage, approximately 60% of the H$_2$S is converted into elemental sulfur.

The gases coming from the combustion chamber are cooled to about 160° C. in a sulfur condenser, in which the sulfur formed is condensed, which subsequently flows into a sulfur pit through a siphon.

The non-condensed gases, in which the molar ratio of H$_2$S:SO$_2$ is unchanged and so still 2:1, are subsequently heated to about 250° C. and passed through a first catalytic reactor in which the equilibrium $$4H_2S + 2SO_2 \rightarrow 4H_2O + 6/nS_n \quad (2)$$

is again established.

The gases coming from this catalytic reactor are subsequently cooled again in a sulfur condenser, in which the liquid sulfur formed is recovered and the remaining gases, after being re-heated, are passed to a second catalytic reactor.

When the gaseous feedstock contains H$_2$S concentrations of between about 15 and 50%, the above described 'straight-through' process is not used, but instead a variant thereof, the so-called 'split-flow' process is employed. In the latter process one-third of the total amount of feedstock is passed to the thermal stage and combusted completely to SO$_2$ therein. Two-thirds of the feedstock is passed direct to the first catalytic reactor, by-passing the thermal stage.

When the feedstock contains H$_2$S concentrations of between 0 and 15% the Claus process can no longer be used. The process then used is, for example, the so-called Recycle Selectox process, in which the feedstock is passed with an adjusted amount of air into an oxidation reactor, the so-called oxidation stage. The reactor contains a catalyst which promotes the oxidation of H$_2$S to SO$_2$, and the amount of oxidation air is adjusted so that an H$_2$S:SO$_2$ ratio of 2:1 is established, whereafter the Claus reaction proceeds. The gas from the oxidation reactor is cooled in a sulfur condenser, in which the sulfur formed is condensed and discharged.

To dissipate the reaction heat generated in the oxidation reactor, a portion of the gas stream coming from the sulfur condenser is re-supplied to the oxidation reactor.

It is clear that in the Recylce Selectox process, the oxidation stage, which is catalytic and does not lead to high temperatures, is equivalent to the thermal stage in the Claus process.

In the following, both stages are referred to as oxidation stages.

Depending on the number of catalytic stages, the sulfur recovery percentage in a conventional Claus unit is 92-97%.

By known processes, the H$_2$S present in the residual gas from the Claus reaction is converted, by combustion or some other form of oxidation, into SO$_2$, whereafter this SO$_2$ is emitted to the atmosphere. This has been permissible for low concentrations or small amounts of emitted SO$_2$ for a long time. Although SO$_2$ is much less harmful and dangerous than H$_2$S, however, this substance is also so harmful that its emission is also limited by ever stricter environmental legislation.

As has been observed, in the Claus process as described above, in view of the equilibrium reaction which occurs, the H$_2$S:SO$_2$ ratio plays an important role. In order to obtain an optimum conversion to sulfur, this ratio should be 2:1. Generally speaking, this ratio is controlled by means of a so-called H$_2$S/SO$_2$ residual gas analyzer. This analyzer measures the H$_2$S and SO$_2$ concentrations in the residual gas. A controller then maintains the ratio of 2:1 constant on the basis of the equation $$[H_2S] - 2[SO_2] = 0,$$

by varying the amount of combustion air, depending on the fluctuations in the gas composition and the resulting deviation in the above equation. Such a control of the process, however, is highly sensitive to these fluctuations.

Furthermore, the sulfur recovery efficiency (calculated on the amount of H$_2$S supplied) is no higher than 97%, and so the gas flowing from the last catalytic stage—the residual gas—still contains substantial amounts of $H_2S$ and $SO_2$, determined by the Claus equilibrium, and this in a molar ratio of 2:1.

The amount of $H_2S$ present in the residual gas can be separated by absorption in a liquid.

The presence of $SO_2$ in the residual gas, however, is a disturbing factor during the further processing thereof and must therefore be removed prior to such further processing. This removal and hence the after-treatment of the gas is complicated.

The great disadvantage of the presence of $SO_2$ is that this gas reacts with conventional liquid absorbents to form undesirable products. To prevent undesirable reactions of the $SO_2$, therefore, the $SO_2$ is catalytically reduced with hydrogen to form $H_2S$ over an $Al_2O_3$ supported cobalt molybdenum catalyst in accordance with the so-called SCOT process. The total amount of $H_2S$ is subsequently separated by liquid absorption in the usual manner.

In accordance with another method, for example, the BSR Selectox process, after reduction of the $SO_2$ in residual gas to $H_2S$ and after condensation of the water vapour, the gas is passed into an oxidation reactor, as in the Recycle Selectox process. The oxidation air is adjusted so that an $H_2S:SO_2$ ratio of 2:1 is adjusted, whereafter the Claus reaction proceeds. Both in the SCOT process and in the BSR Selectox process, the removal of $SO_2$ from the residual gas is a relatively expensive operation.

The above-described after-treatment of the gases, carried out by means of a so-called Tail Gas Treater, which involves an investment of another 50–100% of the cost of the preceding Claus converter, can result in an increase of the sulfur recovery efficiency of up to 98–99.8%.

In NL-A-6901632, it is proposed that the ratio of hydrogen sulfide to sulfur dioxide in the above reaction (1) be adjusted to between 2.5:1 to 4.0:1.

In NL-A-7603622, it is proposed that the above reaction (1) be conducted with an insufficient amount of oxygen, that is to say, with a proportion of oxygen less than required to combust one third of the quantity of $H_2S$ supplied to the burner. Thus, relative to $H_2S$, a substoichiometric amount of $SO_2$ is formed in reaction (1), so that ultimately, in view of the equilibrium reaction (2), the resulting ratio of $H_2S:SO_2$ becomes higher than 2:1.

DESCRIPTION OF THE DRAWING

The invention will be more completely understood from a consideration of the following detailed description taken in conjunction with the drawings, in which:

FIGS. 3a–d are partial flow charts showing variations of the sulfur removal process of the invention.

Figure 1:
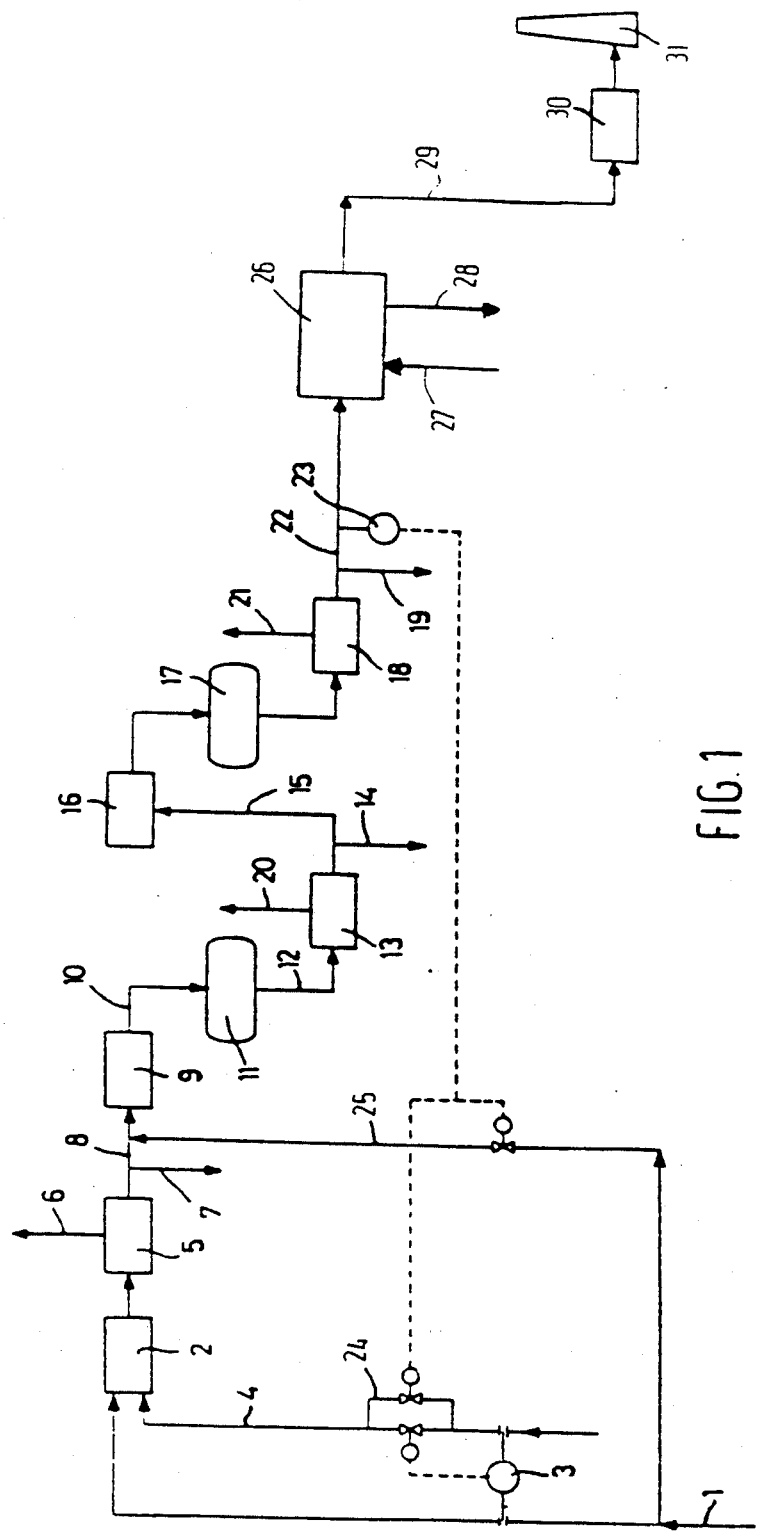
FIG. 1 is a flow chart of a two-stage Claus plant for removing sulfur from gas streams, including a final sulfur-removal stage according to the present invention.

There is no disclosure in that patent application as regards a ratio of $H_2S:SO_2$, nor is any suggestion given as to how such a ratio must be concretely realized.

Accordingly, the methods as described in the above patent applications have the advantage that the removal of $H_2S$ from the residual gas is much easier when substantial amounts of $SO_2$ are contained therein. The methods also have substantial disadvantages, however, namely, that in the presence of sulfur vapour measuring low $SO_2$ concentrations in the residual gas is very difficult. Indeed, controlling the process on the basis of such measurements has turned out to be virtually unfeasible in practice.

DESCRIPTION OF THE INVENTION

According to the present invention, hydrogen sulfide present in the gaseous feedstock to a Claus converter is partially oxidized with oygen, whereafter the product gas from the oxidative stage is reacted further, by using at least two catalytic stages, in accordance with the equation:

$$2H_2S + SO_2 \rightleftharpoons 2H_2O + 3/n\, S_n, \qquad (2)$$

with the $H_2S$ concentration in the residual gas leaving the last catalytic stage being controlled to have a value of between 0.8 and 5% by volume by reducing the amount of combustion or oxidation air passed to the oxidation stage, and/or by causing a portion of the hydrogen sulfide containing feedstock to bypass the oxidation stage, and adding it to the gas flowing to a catalytic stage.

The process according to the invention offers the advantage that no sensitive control of the process is required, because it is only the concentration of the $H_2S$ in the residual gas and not the ratios of $H_2S:SO_2$ therein which play a role. Claus catalysts are sensitive to sulfation under the influence of traces of oxygen in the reaction gases. In the process according to the present invention, as the Claus reaction proceeds, an ever increasing excess of $H_2S$ is formed in the reaction gases, in particular in the last Claus reactor. This excess of $H_2S$ reduces any sulfate that has been formed, whereby the problem of sulfation of the catalysts is counteracted and a longer service life thereof is obtained.

In the process according to the present invention, the concentration of the hydrogen sulfide gas in the residual gas can be controlled in several ways. Thus, for example, the signal from an $H_2S$ analyzer in the residual gas can be used to set or adjust the amount of combustion air or oxidation air supplied to the oxidation stage. The signal can also be used to pass, as a function thereof, a variable amount of $H_2S$ direct to the first or second catalytic reactor or to both reactors.

Measurements conducted in a Claus plant comprising two catalytic stages and operated using the present invention, indicated that, to provide a proportion of 0.8–5% by volume of $H_2S$ in the residual gas, an amount of air must be supplied that is equivalent to 86–98.5% of the stoichiometric quantity (i.e., relative to the amount of air required to combust one-third of the amount of $H_2S$ supplied to the burner). It will be clear, where reference is made to a quantity of air, what is meant is the amount of gas containing the required amount of oxygen. When the amount of air passed to the Claus burner is not reduced but a portion of the gaseous feedstock is caused to by-pass the oxidation stage, approximately 1.5–14% of the available quantity of $H_2S$ containing gas must be by-passed which is dictated by the reactions which occur.

According to the invention it has further been found that a concentration of $H_2S$ in the residual gas of about 1–3% by volume corresponds to an $H_2S/SO_2$ ratio therein of about 15–800, while with increasing percentages by volume of $H_2S$ in the residual gas—within the range defined according to the invention—this value rapidly becomes infinitely high, so that only immeasurably small quantities of SO$_2$ are present. This offers an additional advantage, because for the further processing of this gas the removal of SO$_2$ is unnecessary.

The process according to the invention can be suitably applied for the treatment of gases containing hydrogen sulfide, but also for gases containing both hydrogen sulfide and substantial quantities of ammonia (cf NL-C-176160); in the latter case, the temperature in the combustion chamber should be at least 1,250° C.

In the process according to the invention, the hydrogen sulfide gas remaining in the residual gas can be processed to form sulfur by a known per se method. Such methods are described in the literature. Preferably, however, the remaining gaseous hydrogen sulfide is oxidized with air in an oxidation stage to form sulfur in accordance with the following reaction:

$$2H_2S + O_2 \rightarrow 2H_2O + 2/n\ S_n \qquad (3).$$

Surprisingly it was found that, when the concentration of the hydrogen sulfide leaving the last catalytic stage is maintained at a value of between 0.8 and 5% by volume, not only is a sufficiently low SO$_2$ concentration obtained in the residual gas, but also, after this selective oxidation, an optimum sulfur recovery percentage of 98.0–99.8 can be obtained. This oxidation can in principle take place in two ways, namely, by dry-bed oxidation or by oxidation in a liquid, in which, in general, sulfur and water vapour have first been removed from the residual gas.

In the dry-bed oxidation, the H$_2$S concentration in the residual gas is preferably maintained between 0.8 and 3% by volume, because above 3% by volume of H$_2$S the total sulfur recovery percentage is decreased. Commonly, when the H$_2$S concentration is higher than 2% by volume, the oxidation bed is cooled or the H$_2$S concentration is reduced by dilution of the gas with, for example, a recycling gas stream to prevent oxidation of the sulfur formed to yield SO$_2$ in the gaseous phase as a result of an increase in temperature from the reaction heat generated.

In the dry oxidation bed, the oxidation to sulfur can be effected by a known per se method using an oxidation catalyst. One example of an oxidation catalyst and the application thereof is described in US-A-4311683.

The method described therein is the Selectox process (R. H. Hass, M. N. Ingalis, T. A. Trinker, B. G. Goar, R. SS. Purgason, 'Process meets sulfur recovery needs', Hydrocarbon Processing, May 1981, pag.104–107). In this process, H$_2$S is oxidized to S and SO$_2$ using a special catalyst. Approximately 80% of the H$_2$S supplied is oxidized to elemental sulfur, if water vapour is removed to a substantial extent. Another application of a dry-bed process, which is not sensitive to water vapour in the process gas, is the absorption of H$_2$S in an absorption mass as described, for example, in European patent application No. 71983.

In accordance with a particular embodiment of the process according to the present invention, the oxidation is carried out in a dry bed, using a catalyst comprising a carrier of which under the reaction conditions applied the surface exposed to the gaseous phase does not exhibit alkaline properties with a catalytically active material applied thereto or formed thereon, the specific area of the catalyst being less than 20 m$^2$/g catalyst, and less than 10% of the total pore volume having a pore radius of between 5 and 500 Å. The catalyst generally contains at least 0.1% by weight, calculated on the total mass of the catalyst, of a material that is catalytically active for the selective oxidation of H$_2$S to elemental sulfur. A preferred catalytically active material is a metal oxide, a mixed oxide of a plurality of metals, or a mixture of metal oxides. Such a catalyst is described in the patent application filed concurrently herewith. Neither the catalyst per se nor its preparation are claimed in the present application.

The specific area of the catalyst used in accordance with the above particular embodiment of the process according to the invention is preferably no larger than 10 m$^2$/g catalyst. The substantial absence of micropores, too, is of importance for the results to be obtained by this catalyst: preferably, no more than 2% of the total pore volume will be in the form of pores having a radius of between 5 and 500 Å.

A particularly suitable carrier is alpha-alumina, but silica whose specific area satisfies the above requirements, such as hydrothermally sintered silica, can be suitably applied. It is also possible to use non-ceramic materials as carrier material, such as metal mesh, metal mouldings, or packing bodies.

As stated above, the catalytically active material used is preferably a metal oxide, a mixed oxide of a plurality of metals or a mixture of metal oxides. Preferably, however, the catalytically active material used is iron oxide or a mixed oxide of iron and chromium (with a molar ratio of Cr:Fe that is lower than 0.5 and preferably between 0.02 and 0.15).

The active component is preferably present on the carrier in a proportion of more than 1% by weight calculated on the total weight of the catalyst. Best results are obtained with catalysts in which this percentage by weight is between 3 and 10, calculated as the weight of the metal oxide or mixed oxide of two or more metals, and calculated on the total weight of the catalyst.

In this connection it should be emphasized that this concerns the active material present on the carrier. In fact, by sintering or a different method of preparation, a portion of the active material, in particular the metal oxide, may be encapsulated within the carrier, for example, by the sintering of narrow pores. The difference between this encapsulated or embedded metal oxide and the metal oxide present on the carrier, however, can be readily determined by the socalled temperature-programmed reduction (TPR). Details of this measuring technique are described in N. W. Hurst, S. J. Gentry, A. Jones and B. D. McNicol Catal.Rev.Sci.Eng 24(2), 233–309 (1982). The amount of metal oxide present on the carrier and accessible to gases can thus be determined. As described in detail in our patent application filed concurrently herewith, corresponding to Netherlands patent application No. 8600959, of Apr. 16, 1986, the catalysts preferably used in the particular embodiment of the process according to the present invention can in principle be prepared using known methods of preparing supported catalysts. With regard to such preparation, however, in view of the unusually small specific area and low microporosity of the catalysts, specific measures should be taken, to ensure, in particular, that the porosity is not increased during preparation.

Particular care is required in homogeneously applying the catalytically active material to the carrier material, while in addition it should be ensured that this homogeneity is maintained during and after the drying procedure.

In order to satisfy these requirements, in the preparation of the catalyst, the carrier material with a small specific area is impregnated under dry conditions with a complex solution. This method is known by the name of incipient wetness method. The complex solution comprises the cations of the active materials complexed in the solution with an organic molecule. Also added to the solution is a quantity of a viscosity increasing compound, such as hydroxyethyl cellulose. By impregnating the carrier material with this complex solution by means of the incipient wetness method, a low-area catalyst is obtained, to which the active material is applied highly homogeneously, and whose microporosity has not increased as compared with the starting carrier material.

During the drying procedure, the temperature must be increased very slowly to maintain homogeneity. Finally a sintering treatment is carried out with the catalyst, whereby micropores are sealed. Electron micrographs, porosimetric measurements, B.E.T. measurements and reactor experiments show whether the catalysts satisfy the requirements.

The use of the catalyst described above for the oxidation in a dry bed of the hydrogen sulfide containing residual gases obtained using the process according to the present invention has the important, in particular economic advantage that such a catalyst is practically insensitive to the presence of water vapour in the residual gas, so that the removal of sulfur and water vapour from this residual gas is unnecessary.

It has been found that—with a view to a maximum sulfur recovery percentage—the choice of the optimum volume percent of $H_2S$ in the residual gas is dependent on the extent of the efficiency of the last oxidation from $H_2S$ to sulfur in the dry oxidation bed. When the efficiency to sulfur of the catalyst used therein is 80–85%, preferably a volume percentage of $H_2S$ in the residual gas of 0.8–1.7 is selected. When the efficiency is 85–90%, preferably a percentage of 1.0–2 is selected, and when the efficiency is 90–95%, the volume percentage of $H_2S$ in the residual gas is preferably adjusted between 1.4 and 2.4.

The liquid oxidation, too, can take place using a known process. Examples of known processes are the Stretford process (the Chemical Engineer, February 1974, pages 84 ff), the Lo-Cat process of Air Resources Inc. or the Takahax process. Preferably, for the liquid oxidation an $H_2S$ concentration is selected which is not too close to the lower limit of 1–4% by volume, because at a low $H_2S$ concentration the activity of the liquid decreases relatively rapidly by undesired side reactions of residual quantities of $SO_2$.

The control of the oxidation air to the selective oxidation is not critical and hence simple.

The process according to the invention can be carried out in an existing Claus plant and requires only relatively simple modifications of the existing control of the gas streams. In case a 2-stage Claus plant is used, a selective oxidation reactor will have to be provided in the specific embodiment of the present invention, which in relation to the cost involved in other residual gas processing plants is inexpensive. Thus the application of the process according to the present invention leads to considerable economic advantages.

In case a 3-stage Claus plant is used only the third catalytic reactor needs to be arranged as a selective oxidation reactor. Thus in this case too, therefore, a considerable economic benefit is obtained.

BRIEF DESCRIPTION OF THE DRAWINGS

The process according to the present invention will now be described in more detail with reference to the accompanying FIGS. 1, 2 and 3.

As shown in FIG. 1, the feedstock gas (=Claus gas) is supplied through line 1 to the Claus burner with combustion chamber 2. The amount of combustion air, controlled by the quantity-proportion regulator 3 and $H_2S$ analyzer 23, is supplied to Claus burner 2 through line 4. The heat generated during the combustion (1,200° C.) of the Claus gas is dissipated in a boiler heated by spent gases, producing steam that is discharged through line 6.

The Claus reaction takes place in the burner and the combustion chamber. The sulfur formed is condensed in boiler 5 (150° C.) and discharged through line 7. The gas is passed through line 8 to a heater 9 where it is heated to the desired reaction temperature of 250° C. before being supplied through line 10 to the first Claus reactor 11. In reactor 11 the Claus reaction takes place again, whereby sulfur is formed. The gas is discharged through line 12 to the sulfur condensor 13. The condensed sulfur (150° C.) is discharged through line 14. Thereafter the gas is passed through line 15 to the next reactor stage, which again includes a heater 16, a reactor 17 and a sulfur condenser 18. In this reactor the Claus reaction takes place again. The condensed sulfur (150° C.) is discharged through line 19. The steam generated in the sulfur condensers is discharged through lines 20 and 21.

The $H_2S$ concentration in the residual-gas line 22 is controlled by an $H_2S$ analyzer 23 to a range of from 0.8 to 5% by volume. The $H_2S$ analyzer controls a control valve in combustion air line 24 or a control valve in the $H_2S$ line 25. Through 25 a portion of the $H_2S$ can be passed direct to the first catalytic stage 11, by-passing the thermal stage.

The residual gas is passed through line 22 to the sulfur removing stage 26. This sulfur removing stage may be a known sulfur removing process, such as, for example, a dry-bed oxidation stage, an absorption stage or a liquid-oxidation stage. The air required for the oxidation is supplied through line 27. The sulfur formed is discharged through line 28.

The gas is then passed through line 29 to an afterburner 30 before being discharged through chimney 31.

Figure 2:
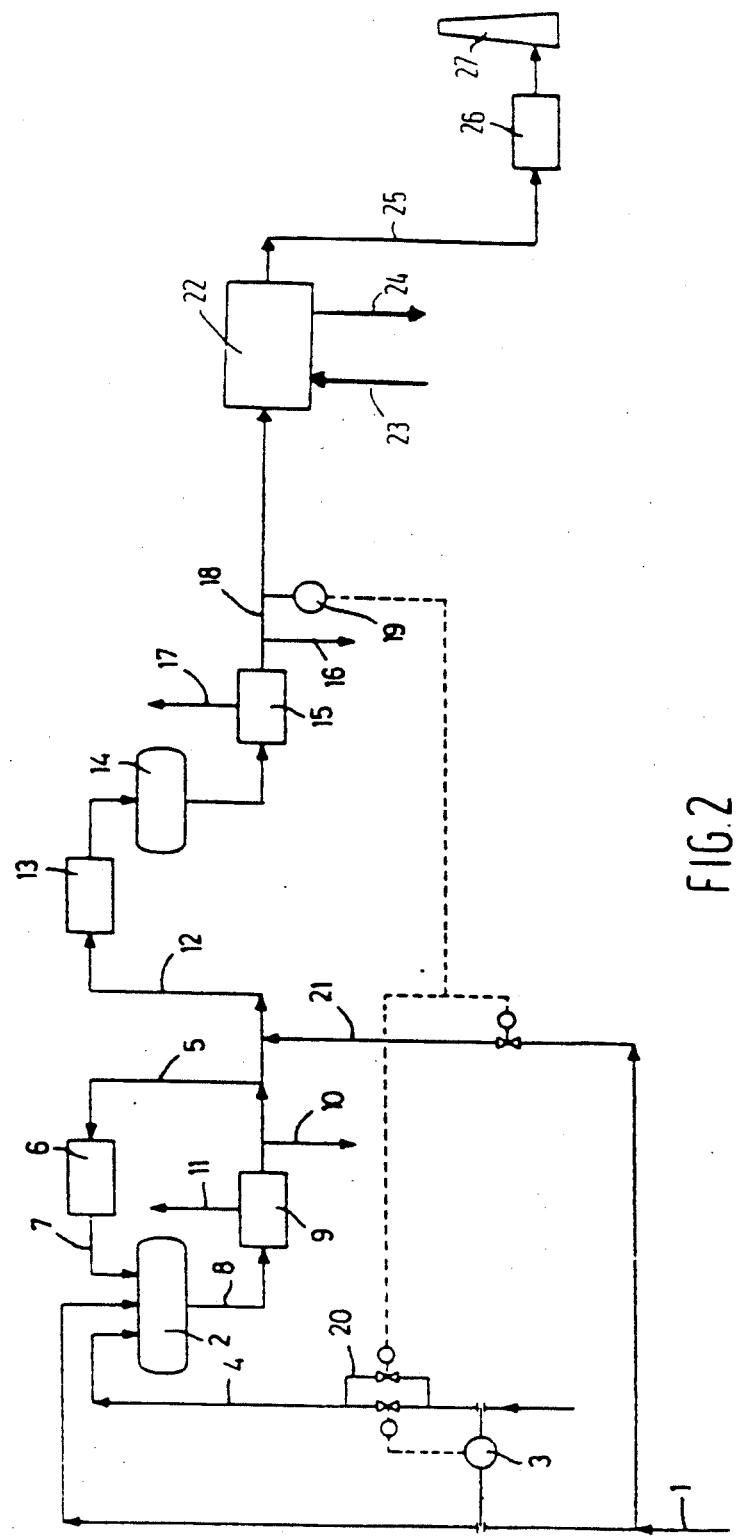
FIG. 2 is a flow chart of an alternative process for removing sulfur from a lean Claus feed stock, also including a final sulfur removal stage.

As shown in FIG. 2, a lean Claus feedstock gas is supplied through line 1 to an oxidation reactor 2. An amount of oxidation air controlled by the quantity—ratio regulator 3 and $H_2S$ analyzer 19 is passed to the oxidation reactor through line 4. In the oxidation reactor a portion of the $H_2S$ is oxidized over a special catalyst to form $SO_2$ whereafter the Claus reaction takes place.

To prevent an unduly high temperature from arising within the oxidation reactor, as a result of the reaction heat, a quantity of gas is recycled by means of blower 6 through lines 5 and 7. The gas from reactor 2 is passed through line 8 to sulfur condensor 9, where the sulfur formed during the reaction is condensed at 150° C. and discharged through line 10. The heat generated during the reaction is dissipated in sulfur condenser 9 with generation of steam, which is discharged through line 11. The gas is passed through line 12 to a heater 13, where it is heated, for example, to 220° C. before being supplied to the Claus reactor 14. In reactor 14, the Claus reaction takes place again, whereby sulfur is formed. In condenser 15, the sulfur is condensed at 150° C. and discharged through line 16, and steam generated is discharged through line 17. The $H_2S$ concentration in the residual gas line 18 is controlled by an $H_2S$ analyzer 19 to a range of from 0.8 to 5% by volume. The $H_2S$ analyzer controls a control valve in the combustion-air line 20, or a control valve in $H_2S$ line 21.

Through line 21, a portion of the $H_2S$ can bypass the oxidation stage and pass direct to the catalytic stage 14.

The residual gas is passed through line 18 to the sulfur removing stage 22. The air required for the oxidation is supplied through line 23. The sulfur formed is discharged through line 24. The gas is then passed through line 25 to an after-burner 26 before being discharged through chimney 27.

FIG. 3 shows in greater detail the oxidation or absorption in a dry bed and the oxidation in a liquid as indicated more generally in 26 of FIG. 1 or 22 of FIG. 2. In FIGS. 1 and 2 the residual gas is supplied through lines 22 and 18, respectively; in FIG. 3, the residual gas is supplied through line 1.

In FIG. 3a, after the removal of the sulfur from the residual gas in separator 2, which is discharged through line 3, and the condensation of the water in 4, which is discharged through line 5, the gas is supplied through a heater 6 to a selective oxidation reactor 7. The removal of sulfur and water in 2 and 4 respectively, can take place using a known method, for example, as disclosed in U.S. Pat. No. 4526590. In the selective oxidation reactor 7, a catalyst may be provided, for example, as described in the French patent publication Nos. 8009126, 8105029 or 8301426. The required oxidation air is supplied through line 8.

From the reactor, the gas flows to a sulfur condensor 9. The sulfur condensed is discharged through line 10, and the steam generated through line 11. The gas next flows through line 12 to the after-burner as designated by 30 in FIGS. 1 and 26 in FIG. 2.

As shown in FIG. 3b, the residual gas is supplied through line 1 and heater 2 direct to the selective-oxidation stage, that is to say, without a preceding sulfur and water removing stage. This embodiment can be used when a catalyst is present in the oxidation reactor 4, as described above, consisting of a non-alkaline ceramic carrier to which at least 0.1% by weight of a catalytically active material, in particular a metal oxide, has been applied, so that the specific area of the catalyst is less than 20 m$^2$/g, while less than 10% of the total pore volume has a pore radius of between 5 and 500 Å. The oxidation air required is supplied through line 3. The sulfur condensed in sulfur condenser 5 is discharged through line 6 and the steam generated through line 7. The gas next flows through line 8 to the after-burner designated by 30 in FIG. 1 and by 26 in FIG. 2.

As shown in FIG. 3c the residual gas is passed through line 1 to a reactor 2 filled with an absorption mass, for example, as described in European patent application No. 71983. In reactor 2, the hydrogen sulfide is removed from the residual gas by absorption. The gas next flows through line 3 to the after-burner, designated by 30 in FIG. 1 and by 26 in FIG. 2. When the bed is saturated, it is regenerated. Reactor 4 is connected in parallel to reactor 2 and is regenerated. By means of a circulation blower 5, a quantity of gas is circulated. This gas is heated in heater 6. The air required for the oxidation is supplied through line 7. The gas flows from reactor 4 to sulfur condenser 8. The sulfur condensed is discharged through line 9 and the steam generated through line 10. To keep the system at the required pressure, a small gas stream is discharged through line 11 and recycled to the feedstock for the Claus plant (line 1 in FIG. 1 and FIG. 2).

As shown in FIG. 3d, sulfur is removed in separator 2, which is discharged through line 3. Subsequently, in condenser 4, water is condensed which is removed through line 5. The gas is passed to the liquid-oxidation stage 6. The oxidation stage may contain, for example a basic solution of sodium carbonate, ADA (anthraquinone disulphonic acid) and sodium metavanadate, as used in the well-known Stretford process.

$H_2S$ is absorbed in the liquid and subsequently oxidized with air. The oxidation air is supplied through line 7 and the sulfur formed is discharged through line 8. The gas next flows through line 9 to the after-burner (30 in FIGS. 1 and 26 in FIG. 2).

The invention is illustrated in and by the following examples.

EXAMPLE I

Using the apparatus as described with reference to FIGS. 1 and 3a, the Claus reaction is performed in a Claus plant having two catalytic stages. Supplied to the thermal stage are a Claus gas, containing 90% by volume of $H_2S$, corresponding to 90 kmoles/h, 5% vol.-$CO_2$ and 5% vol.$H_2O$ and 43.53 kmoles/h $O_2$ (a 'deficit' of 3.3%) as air oxygen. The $H_2S$ volume percentage in the residual gas after the second catalytic stage is 1.2, and the $SO_2$ content therein 0.06%. After the removal of sulfur and water and using a dry-bed process for the oxidation of $H_2S$ with an oxidation efficiency of 80%, a total sulfur recovery percentage of 98.8 is obtained.

EXAMPLE II

Using the apparatus as described with reference to FIGS. 1 and 3b, the Claus reaction is performed in a Claus plant having two catalytic stages. Supplied to the thermal stage are a Claus gas containing 90% by volume of $H_2S$ corresponding to 90 kmoles/h, 5% by volume of $CO_2$ and 5% by volume of $H_2O$, and 42.30 kmoles/h of $O_2$ (a 'deficit' of 6.0%) as air oxygen. The $H_2S$ volume percentage in the residual gas after the second catalytic stage is 2.03; the $SO_2$ content therein is immeasurably small, and its water content is 35.8% by volume.

The dry-bed oxidation is carried out using a water-insensitive oxidation catalyst, as defined hereinbefore, comprising an alpha-alumina carrier (Fluka, specific area 6.5 m$^2$/g) to which 4.5% by weight of $Fe_2O_3$ and 0.5% by weight of $Cr_2O_3$ have been applied as catalytically active material, which, after pelletization and calcination has a BET area of 6.94 m$^2$/g, with less than 1% of the total pore volume being constituted by pores having a radius less than 500 Å. Using this catalyst with an oxidation efficiency of 90%, a total sulfur recovery percentage of 99.2 is obtained.

EXAMPLE III

In this example, the process as described with reference to FIGS. 2 and 3c is carried out in a trial plant.

A lean Claus feedstock gas with a composition of 10% by volume of $H_2S$, 85% by volume of $CO_2$ and 5% by volume of water is passed to oxidation reactor 2 in FIG. 4 at a rate of 10 moles/h. A quantity of air of 1.56 moles/h, controlled by the quantity ratio regulator 3 and $H_2S$ analyzer 19 is also passed to the oxidation reactor. In addition, a quantity of gas of 2 moles/h containing 0.104 mole/h $SO_2$ is recycled to the oxidation reactor from reactor 4 in FIG. 3c.

In the oxidation reactor a portion of the $H_2S$ is oxidized to $SO_2$ by the air oxygen, whereafter the Claus reaction takes place.

Via blower 6 in FIG. 2 and lines 5 and 7, a quantity of 13 moles/h of gas is recycled. The gas coming from reactor 2 is passed through line 8 to sulfur condenser 9 and subsequently supplied through line 12 and a heater 13, in which it is heated to 220° C., to Claus reactor 14. In this reactor the Claus reaction takes place again, and the sulfur formed is condensed at 150° C. and discharged through line 16. The $H_2S$ concentration in the residual gas line 18 is controlled by an $H_2S$ analyzer 19 to be 1.3% by volume. Through this line 18, the residual gas is passed to reactor 2 (FIG. 3c), which is filled with an absorption mass. In order to keep the system at the desired pressure during the regeneration of the absorption mass, when the absorbed $H_2S$ is oxidized to sulfur, a minor gas stream of 2 moles/h is bled off and recycled to the oxidation reactor.

In total, a sulfur recovery percentage of 99.8 is obtained.

EXAMPLE IV

Using the apparatus as described with reference to FIGS. 1 and 3d, the Claus reaction is carried out in a Claus plant having two catalytic stages. Supplied to the thermal stage are a Claus gas containing 90% by volume of $H_2S$, corresponding to 81.9 kmoles/h, 5% by volume of $CO_2$ and 5% by volume of $H_2O$, and 40.95 kmoles/h $O_2$ (i.e., not a 'deficit'). In this case, however, through line 25, 8.1 kmoles/h $H_2S$ (9.0% of the feedstock gas) is supplied to the first catalytic stage. The $H_2S$ volume percentage in the residual gas after the second catalytic stage is 3.13; the $SO_2$ content thereof is immeasurably small.

After the removal of sulfur and water, and using a liquid-oxidation process for the absorption and oxidation of $H_2S$, with an absorption/oxidation efficiency of 95%, a total sulfur recovery percentage of 99.5 is obtained.

EXAMPLE V

Using the apparatus as described with reference to FIGS. 1 and 3c, the Claus reaction is carried out in a Claus plant having two catalytic stages. To the thermal stage, a Claus gas containing 90% by volume of $H_2S$, corresponding to 90 kmoles/h $H_2S$, 5% by volume of $CO_2$ and 5% by volume of $H_2O$, and 43.14 kmoles/h $HO_2$ (a deficit of 3%) as air oxygen are supplied.

In addition, a quantity of gas of 10 kmoles/h, containing 0.44 kmole/h $SO_2$ is recycled from reactor 4 (FIG. 3C). The $H_2S$ concentration in the residual gas line 22 is controlled by an $H_2S$ analyzer to be 1.2% by volume, which corresponds to 3.26 kmoles/h. The residual gas is oxidized further, using the catalyst as described in Example II. The $H_2O$ content is 35.9% by volume, corresponding to 97 kmoles/h.

Supplied to the selective oxidation stage is 1.96 kmoles/h $O_2$ as air oxygen, which comes down to an $O_2:H_2S$ ratio of 0.6, an oxygen excess of 20%. The gas to the selective oxidation reactor is heated to 180° C. The $H_2S$ in the selective oxidation reactor is fully converted with the bed temperature being 250° C. The oxidation efficiency to elemental sulfur is 90%, the balance is converted to $SO_2$. After the condensation of the sulfur, the gas is mixed with a reducing $H_2/CO$ gas, heated to 280° C. and then supplied to a hydrogenation reactor (not shown). All $SO_2$ in the gas and the remaining sulfur components are converted to $H_2S$.

Through line 1 (FIG. 3C), the gas is passed to reactor 2 which is filled with an absorption mass. The $H_2S$ is absorbed in the absorption mass and thus removed from the gas. The gas flows from reactor 2 through line 3 and an after-burner to the chimney.

In order to keep the system at the desired pressure during the regeneration of the absorption mass, when the absorbed $H_2S$ is oxidized to sulfur, a minor gas stream of 10 kmoles/h is bled off and recycled to the Claus plant.

In total, a sulfur recovery percentage of 99.9 is obtained.

EXAMPLE VI

Using the plant as described with reference to FIG. 1 and 3b, the Claus reaction is carried out in a Claus plant having two catalytic stages.

A Claus gas containing 90% by volume of $H_2S$, corresponding to 90 kmoles/h, 5% by volume of $CO_2$ and 5% by volume of $H_2O$ and 43.53 kmoles/h $O_2$ (a 'deficit' of 3.3%) as air oxygen are supplied to the thermal stage.

The $H_2S$ volume percentage in the residual gas after the second catalytic stage is 1.22, which corresponds to 3.29 kmoles/h, and the $SO_2$ content therein is 0.06. Using the catalyst described in Example II, the $H_2S$ in the gas is selectively oxidized to sulfur in the presence of a considerable concentration of water vapour. The $H_2O$ content is 35.9% by volume, which corresponds to 97 kmoles/h. 1.97 kmoles/h $O_2$, as air oxygen, is supplied to the selective oxidation stage, which comes down to an $O_2:H_2S$ ratio of 0.6, an oxygen excess of 20%.

The gas to the selective oxidation reactor is heated to 180° C. In the selective oxidation reactor, the $H_2S$ is fully converted, with the bed temperature being 250° C. The oxidation efficiency to elemental sulfur is 90%, the balance is converted to $SO_2$. After the condensation of the sulfur formed, the gas is mixed with a reducing $H_2/CO$ gas, heated to 280° C., and then supplied to a hydrogenation reactor in which all of the $SO_2$ in the gas and the remaining sulfur components are converted to $H_2S$.

Subsequently the gas is re-supplied to a selective oxidation stage in which $H_2S$ is oxidized to sulfur, using the catalyst (as used in Example II). The $H_2S$ percentage by volume in this gas is 0.23, which corresponds to 0.64 kmoles/h. The $H_2O$ content therein is 36.2% by volume, which corresponds to 100 kmoles/h.

To the second selective oxidation stage, 0.51 kmoles/h $O_2$ is supplied, as air oxygen, which comes down to an $O_2:H_2S$ ratio of 0.8, an oxygen excess of 60%. The gas to the second selective oxidation reactor is cooled to 215° C. The $H_2S$ in the second selective oxidation reactor is again completely converted, with the bed temperature being 230° C. The oxidation efficiency of $H_2S$ to elemental sulfur in the second stage is 90%, the balance is converted to $SO_2$.

Thus, in the overall system, a total sulfur recovery percentage of 99.8 is obtained. The spent gas is passed through an after-burner to the chimney.

What we claim is:

1. A process for the recovery of sulfur from a hydrogen sulfide containing gas, which comprises:
   oxidizing hydrogen sulfide in a gaseous stream with oxygen in an oxidation stage;
   reacting the product gas of this oxidation further in at least two catalytic stages, in accordance with the equation:

$$2\ H_2S + SO_2 \rightleftharpoons 2\ H_2O + 3/n\ S_n,$$ the $H_2S$ concentration in the gas leaving the last of said at least two catalytic stages being controlled to have a value ranging between 0.8 and 3% by volume by employing at least one of the steps a and b:
   (a) reducing the quantity of combustion or oxidation air passed to the oxidation stage;
   (b) causing a portion of the hydrogen sulfide containing feedstock gas to bypass the oxidation stage and to be added to the gas flowing to one of said at least two catalytic stages; and finally,
   selectively oxidizing $H_2S$ in the gas leaving the last of said at least two catalytic stages to sulfur, employing for this purpose a catalytic stage including a selective oxidation catalyst which is substantially insensitive to the presence of water vapor in the gas stream, is ineffective in promoting establishment of the equilibrium $$2/H_2S + SO_2 \rightleftharpoons 2/H_2O + 3/n\ S_n,\text{ and}$$

is effective to promote oxidation of $H_2S$ to sulfur in the presence of water vapor;
   said step of selectively oxidizing also employing an excess of oxygen compared to stoichiometric oxidation, this excess of oxygen being sufficient to result in an overall excess of oxygen being employed in the total process for the recovery of sulfur from the hydrogen sulfide-containing gas.

2. The process of claim 1, wherein the $H_2S$ concentration in the gas leaving the last of said at least two catalytic stages is maintained at a value of between 1 and 3% by volume.

3. The process of claim 1, wherein the quantity of combustion or oxidation air passed to the oxidation stage is about 86-98.5% of the stoichiometric quantity of air required for optimum conversion of the supplied quantity of hydrogen sulfide to sulfur.

4. The process of claim 1, wherein about 1.5-14% of the available quantity of $H_2S$ containing gas is caused to bypass the oxidation stage and to be added to the gas flowing to one of said at least two catalytic stages.

5. The process of claim 1, wherein, with an oxidation efficiency to sulfur of 80-85% for the selective oxidation catalyst, an $H_2S$ concentration of 0.8-1.7% by volume is selected in the gas coming from the last of said at least two catalytic stages.

6. The process of claim 1, wherein, with an oxidation efficiency to sulfur of 85-90% for the selective oxidation catalyst, an $H_2S$ concentration of 1.0-2% by volume is selected in the gas coming from the last of said at least two catalytic stages.

7. The process of claim 1, wherein, with an oxidation efficiency to sulfur of 90-95% for the selective oxidation catalyst, an $H_2S$ concentration of 1.4-2.4% by volume is selected in the gas coming from the last of said at least two catalytic stages.

8. The process of claim 1, wherein said selective oxidation catalyst includes a carrier of which, under the reaction conditions applied, the surface exposed to the gaseous phase does not exhibit alkaline properties, said carrier having a catalytically active material applied thereto or formed thereon, the specific area of the selective oxidation catalyst being less than 20 $m^2/g$ catalyst, and less than 10% of the total pore volume having a pore radius of between 5 and 500 Å.

9. The process of claim 8, wherein less than 2% of the total pore volume of said selective oxidation catalyst are pores having a pore radius of between 5 and 500 Å.

10. The process of claim 8, wherein said selective oxidation catalyst has a specific area less than 10 $m^2/g$ catalyst.

11. The process of claim 8, wherein the carrier material employed in the selective oxidation catalyst is alpha-alumina or hydrothermally sintered silica.

12. The process of claim 8, wherein the catalytically active material is present on the carrier of the selective oxidation catalyst in a proportion of 0.1-10% by weight calculated on the total mass of the catalyst.

13. The process of claim 8, wherein the catalytically active material employed in the selective oxidation catalyst is a metal oxide, a mixed oxide of a plurality of metals, or a mixture of metal oxides.

14. The process of claim 13, wherein the catalytically active material is iron oxide or a mixed oxide of iron and chromium.

* * * * *

UNITED STATES PATENT AND TRADEMARK OFFICE
CERTIFICATE OF CORRECTION

PATENT NO. : 4,988,494
DATED : January 29, 1991
INVENTOR(S) : Jan A. Lagas, et al.

It is certified that error appears in the above-identified patent and that said Letters Patent is hereby corrected as shown below:

Column 1, line 25, "2SO" should read --$2SO_2$--.

Column 1, line 61, "250°C" should read --250°C,--.

Column 8, line 1, "too, therefore, a" should read --too, a--.

Column 11, line 12, "220°C.," should read --220°C,--.

Signed and Sealed this

Eighth Day of September, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,988,494
DATED : January 29, 1991
INVENTOR(S) : Jan A. Lagas, et al.

It is certified that error appears in the above-indentified patent and that said Letters Patent is hereby corrected as shown below:

On the cover page, item [73] Assignee:
"Comprino" should read --Comprimo--.

Signed and Sealed this

Eighteenth Day of April, 1995

Attest:

BRUCE LEHMAN

Attesting Officer

*Commissioner of Patents and Trademarks*